US011132225B2

(12) United States Patent
Patil et al.

(10) Patent No.: US 11,132,225 B2
(45) Date of Patent: Sep. 28, 2021

(54) SYSTEM AND METHOD FOR MANAGEMENT OF PROCESSING TASK ACROSS PLURALITY OF PROCESSORS

(71) Applicant: Innoplexus AG, Eschborn (DE)

(72) Inventors: Prashant Patil, Pune (IN); Pratima Sakpal, Pune (IN); Vishal Tiwari, Thane (IN)

(73) Assignee: Innoplexus AG, Eschborn (DE)

( * ) Notice: Subject to any disclaimer, the term of this patent is extended or adjusted under 35 U.S.C. 154(b) by 86 days.

(21) Appl. No.: 16/369,678

(22) Filed: Mar. 29, 2019

(65) Prior Publication Data
US 2020/0310871 A1 Oct. 1, 2020

(51) Int. Cl.
G06F 9/46 (2006.01)
G06F 9/48 (2006.01)
G06F 16/907 (2019.01)
G06F 9/50 (2006.01)

(52) U.S. Cl.
CPC ............ *G06F 9/4887* (2013.01); *G06F 9/505* (2013.01); *G06F 9/5088* (2013.01); *G06F 16/907* (2019.01)

(58) Field of Classification Search
CPC ...... G06F 9/4887; G06F 16/907; G06F 9/505; G06F 9/5088
See application file for complete search history.

(56) References Cited

U.S. PATENT DOCUMENTS

| 5,666,524 A * | 9/1997 | Kunkel | G06F 16/24532 |
| 9,811,544 B1 * | 11/2017 | Taylor | G06F 16/90 |
| 9,935,940 B1 * | 4/2018 | DeMoss | G06F 21/00 |
| 10,733,116 B2 * | 8/2020 | Litichever | G06F 13/4282 |
| 2004/0088283 A1 * | 5/2004 | Lissar | G06F 16/902 |
| 2005/0060286 A1 * | 3/2005 | Hansen | G06F 16/951 |
| 2006/0241968 A1 * | 10/2006 | Hollebeek | G06F 9/5011 705/2 |
| 2009/0031006 A1 * | 1/2009 | Johnson | H04W 4/14 709/218 |
| 2012/0260040 A1 * | 10/2012 | Mallge | G06F 16/278 711/117 |
| 2014/0214799 A1 * | 7/2014 | Li | G06F 16/24532 707/718 |
| 2014/0279883 A1 * | 9/2014 | Kostenko | G06F 9/5061 707/618 |

(Continued)

*Primary Examiner* — Adam Lee

(74) *Attorney, Agent, or Firm* — Ziegler IP Law Group, LLC

(57) ABSTRACT

Disclosed is a system and method for management of a task across a plurality of processors, wherein the task processing of a plurality of records. The system includes a plurality of processors and an administrator module. Each of the plurality of processors processes a set of records added in a given time interval and the administrator module determines the time interval for a given processor. The administrator module is operable to receive a timestamp detailing a time when the given record was added to the database arrangement; determine a time period in which the plurality of records were added to the database arrangement; determine a time and record threshold for a given processor; and adjust the time interval allocated to each of the plurality of processors according to the time threshold and the record threshold, based on a time-based distribution of records in the database arrangement.

11 Claims, 2 Drawing Sheets

(56) References Cited

U.S. PATENT DOCUMENTS

| | | | |
|---|---|---|---|
| 2015/0254288 A1* | 9/2015 | Garth | G06F 9/5005 |
| | | | 707/753 |
| 2016/0337426 A1* | 11/2016 | Shribman | H04L 65/608 |
| 2016/0378752 A1* | 12/2016 | Anderson | G06F 16/245 |
| | | | 707/747 |
| 2018/0329962 A1* | 11/2018 | Schrijen | G09C 1/00 |
| 2019/0266057 A1* | 8/2019 | Dalal | G06F 11/1451 |

* cited by examiner

SYSTEM AND METHOD FOR MANAGEMENT OF PROCESSING TASK ACROSS PLURALITY OF PROCESSORS

TECHNICAL FIELD

The present disclosure relates generally to management of processing units; and more specifically, to systems and methods for management of a processing task amongst a plurality of processors.

BACKGROUND

With advancements in technology and rapid expansion of digital sector, data has become an increasingly valued commodity. Notably, data is processed and utilized to extract useful information and obtain meaningful insights that have a real-world impact. With exponential increase in volume of data, software tools are increasingly deployed for processing of data for extraction of useful information and obtain meaningful insights therefrom.

However, such software tools deployed for processing large amounts of data have not been successfully implemented owing to dynamic nature of database storing the data. It will be appreciated that the data is stored in databases in form of records. Specifically, number of records stored in the databases keep on increasing with time. Subsequently, systems (implemented by way of the software tools) employ parallel processing techniques for processing of the increasing number of records for extraction of useful information.

Typically, the conventional systems performing parallel processing of the records stored in database equally allocate records amongst a plurality of processors for processing thereof. Subsequently, such equal allocation of records to each of the plurality of processors ensure uniform load distribution. However, in such case, a second processor needs to skip a batch of records that is processed by a first processor. Similarly, a hundredth processor needs to skip batches of records that are processed by each of the first to a ninety-ninth processor. In this regard, the processes of skipping of batches of records imposes additional load on the plurality of processors except the first processor. Consequently, performance of the plurality of processors is affected adversely, owing to such additional load. Moreover, such processes of skipping of batches of records affects run-time efficiency of the system.

Therefore, in light of the foregoing discussion, there exists a need to overcome the aforementioned drawbacks associated with the conventional system for processing of plurality of records.

SUMMARY

The present disclosure seeks to provide a system for management of a task across a plurality of processors, wherein the task comprises processing of a plurality of records. The present disclosure also seeks to provide a method for management of a task across a plurality of processors, wherein the task comprises processing of a plurality of records. The present disclosure seeks to provide a solution to the existing problem of additional load imposed on processors due to skipping of processed records. An aim of the present disclosure is to provide a solution that overcomes at least partially the problems encountered in prior art, and provides a system allocates a batch of records to each of the plurality of processors for processing thereof, with regard to a timestamp associated with the batch of records.

In one aspect, an embodiment of the present disclosure provides a system for management of a task across a plurality of processors, wherein the task comprises processing of a plurality of records stored in a database arrangement, wherein the system comprises a plurality of processors and an administrator module, and wherein each of the plurality of processors processes a set of records added in a given time interval and the administrator module determines the time interval for a given processor, wherein the administrator module is operable to:
  receive metadata associated with each of the plurality of records from the database arrangement, wherein metadata associated with a given record comprises a timestamp detailing a time when the given record was added to the database arrangement;
  determine, from the metadata associated with each of the plurality of records, a time period in which the plurality of records were added to the database arrangement;
  determine, from the time period and number of processors, a time threshold for a given processor;
  determine, from the number of records and the number of processors, a record threshold for a given processor; and
  adjust the time interval allocated to each of the plurality of processors according to the time threshold and the record threshold, based on a time-based distribution of records in the database arrangement.

In another aspect, an embodiment of the present disclosure provides a method for management of a task across a plurality of processors, wherein the task comprises processing of a plurality of records stored in a database arrangement, wherein the method is implemented using a system comprising a plurality of processors and an administrator module, and wherein each of the plurality of processors processes a set of records added in a given time interval and the administrator module determines the time interval for a given processor, wherein the method comprises:
  receiving metadata associated with each of the plurality of records from the database arrangement, wherein metadata associated with a given record comprises a timestamp detailing a time when the given record was added to the database arrangement;
  determining, from the metadata associated with each of the plurality of records, a time period in which the plurality of records were added to the database arrangement;
  determining, from the time period and number of processors, a time threshold for a given processor;
  determining, from the number of records and the number of processors, a record threshold for a given processor; and
  adjusting the time interval allocated to each of the plurality of processors according to the time threshold and the record threshold, based on a time-based distribution of records in the database arrangement.

Embodiments of the present disclosure substantially eliminate or at least partially address the aforementioned problems in the prior art, and enables time-efficient load distribution of records employing timestamps associated with the records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
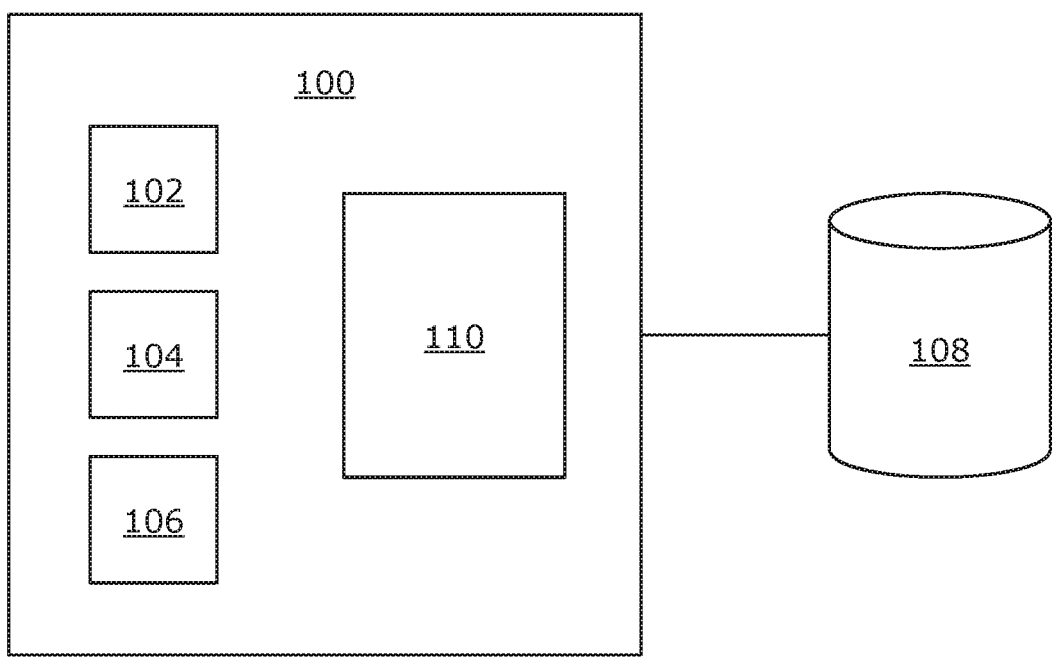
FIG. 1 is a block diagram of a system for management of a task across a plurality of processors, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for management of a task across a plurality of processors, wherein the task comprises processing of a plurality of records stored in a database arrangement, wherein the system comprises a plurality of processors and an administrator module, and wherein each of the plurality of processors processes a set of records added in a given time interval and the administrator module determines the time interval for a given processor, wherein the administrator module is operable to:
  receive metadata associated with each of the plurality of records from the database arrangement, wherein metadata associated with a given record comprises a timestamp detailing a time when the given record was added to the database arrangement;
  determine, from the metadata associated with each of the plurality of records, a time period in which the plurality of records were added to the database arrangement;
  determine, from the time period and number of processors, a time threshold for a given processor;
  determine, from the number of records and the number of processors, a record threshold for a given processor; and
  adjust the time interval allocated to each of the plurality of processors according to the time threshold and the record threshold, based on a time-based distribution of records in the database arrangement.

In another aspect, an embodiment of the present disclosure provides a method for management of a task across a plurality of processors, wherein the task comprises processing of a plurality of records stored in a database arrangement, wherein the method is implemented using a system comprising a plurality of processors and an administrator module, and wherein each of the plurality of processors processes a set of records added in a given time interval and the administrator module determines the time interval for a given processor, wherein the method comprises:
  receiving metadata associated with each of the plurality of records from the database arrangement, wherein metadata associated with a given record comprises a timestamp detailing a time when the given record was added to the database arrangement;
  determining, from the metadata associated with each of the plurality of records, a time period in which the plurality of records were added to the database arrangement;
  determining, from the time period and number of processors, a time threshold for a given processor;
  determining, from the number of records and the number of processors, a record threshold for a given processor; and
  adjusting the time interval allocated to each of the plurality of processors according to the time threshold and the record threshold, based on a time-based distribution of records in the database arrangement.

The aforesaid system for management of a task across a plurality of processors provides a platform that parallelly processes a plurality of records to derive intelligible information therefrom. Specifically, the system described herein operates as a platform that enables uniform allocation of records to the plurality of processors for processing thereof. Beneficially, the system ensures uniform load distribution among the plurality of processors and timely completion of the task. Moreover, the system aims to enable parallel processing of a task comprising the plurality of records, without any scaling in infrastructure of the processors. Specifically, the task is processed by the system such that the plurality of processors share substantially equivalent processing load. Subsequently, such equal distribution of load ensures that each of the plurality of processors complete an allocated portion of task in substantially similar amount of time thereby making the system time-efficient. Typically, the system allocates a batch of records to each of the plurality of processors for processing thereof, with regard to a timestamp associated with the batch of records. Consequently, the plurality of processors does not need to operate so as to skip previously processed batches of records. Beneficially, such allocation of the batch of records to each of the plurality of processors prevents the plurality of processors from working with an additional load of skipping process. Moreover, overcoming the additional load further makes the process of processing more optimal in terms of run-time, speed, and computational power utilized.

The present disclosure provides a system for management of a task across a plurality of processors. Notably, management of the task refers to allocation of the task to the plurality of processors for efficient completion thereof. In other words, the task is allocated (namely, distributed) across the plurality of processors for parallel execution of the task. Specifically, the task is managed across the plurality of processors in a manner that each of the plurality of processors has substantially equivalent processing load and thus ensuring that a particular set of processors is not overloaded while another set of processors is under-utilized. Furthermore, managing the task in a manner that the plurality of processors share substantially equivalent processing load ensures that each of the plurality of processors completed the allocated portion of task in substantially similar amounts of time and thus the task is managed in a time-efficient manner.

As mentioned previously, the task comprises processing of a plurality of records. Specifically, processing of a given record refers to using a processor to view, store, organize, append, modify, extract information and so forth from the given record. In other words, processing of a given record refers to performing a sequence or a set of actions on the given record by the processor. Throughout the present disclosure, the term "record" refers to a set of files in which information is recorded, wherein the information is recorded as a data type. Some examples of various data types are text data, tabular data, image data, multimedia data and so forth. Thus, records may be in any suitable file formats depending upon the data type in which the information is recorded. Moreover, the plurality of records further comprise associated attributes relating to the record. In an example, the associated attribute may include a structure relating to the record such as a layout of the record, a type of the record, and so forth.

Furthermore, the plurality of records are stored in a database arrangement. The term "database arrangement" as used herein refers to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Optionally, the database arrangement may be operable to support relational operations, regardless of whether it enforces strict adherence to the relational model, as understood by those of ordinary skill in the art.

The system comprises a plurality of processors and an administrator module. Throughout the present disclosure, the term "processor" refers to a computational unit that is operable to respond to and processes instructions for processing of the records. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term 'processor' refers to one or more individual processors, processing devices and various elements associated with the processor, configured together as a unit. Additionally, the one or more individual processors, processing devices and elements are arranged in various architectures for responding to and processing the instructions that drive the processor. Furthermore, the term "administrator module" refers to a programmable module configured in the system to determine and allocate time intervals to processors, wherein the processor only processes records added in the allocated time interval.

Additionally, the administrator module is implemented by way of hardware, software, firmware and/or any combination thereof.

It will be appreciated each of the plurality of processors processes a set of records added in a given time interval. Conventionally, for parallel processing of plurality of records in a database arrangement, records are divided in an equivalent manner amongst the plurality of processors. However, for a given processor to process a set of records (from amongst the plurality of processors) allocated thereto, the given processor has to skip through the records present prior to the set of records allocated thereto. However, in the present disclosure, each of the plurality of processors is allocated a time interval, wherein a given processor only processor the records added in the time interval allocated thereto. Furthermore, the administrator module determines the time interval for a given processor. Specifically, the time intervals for the plurality of processors are determined in a manner that each of the time interval has substantially similar number of records added therein. In other words, records are generally added to the database in a non-uniformly with respect to time. Specifically, number records added to the database arrangement in a given time duration may be higher or lower as compared to another time duration of the same length. Therefore, the time intervals for the plurality of records are determined according to time-based distribution of records in the database arrangement. It is to be understood that a length (for example, the length may be in seconds, minutes, hours, weeks and so forth) of a time interval allocated to a given processor may be substantially different from a length of a time interval allocated to another processor and thus, time interval for each of the plurality of processors is determined based on the time-based distribution of records in the database arrangement.

The administrator module is operable to receive metadata associated with each of the plurality of records from the database arrangement. As mentioned previously, the plurality of records are stored in the database arrangement. Notably, the database arrangement further comprises metadata associated with each of the plurality of records. Specifically, the metadata associated with a given record may include metadata related to the properties and creation of the record (such as record type, time of creation, entities associated with the creation of the record and so forth), and metadata related to addition of record in the database arrangement. Specifically, metadata associated with a given record comprises a timestamp detailing a time when the given record was added to the database arrangement. In other words, the database arrangement assigns the timestamp to a given record when it is added to the database arrangement. Consequently, the timestamp is included in the metadata associated with the record. Therefore, metadata associated with the plurality of records (primarily comprising timestamps detailing times when each of the plurality of records was added in the database arrangement) are communicated to the administrator module by the database arrangement.

Optionally, the database arrangement and the administrator module are communicably coupled using a data communication network. Specifically, the term data communication network refers to an arrangement of interconnected programmable and/or non-programmable components that are configured to facilitate data communication between one or more electronic devices and/or databases, whether available or known at the time of filing or as later developed. Furthermore, the data communication network includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the data communication network includes wired or wireless communication that can be carried out via any number of known protocols, including, but not limited to, Internet Protocol, Wireless Access Protocol (WAP), Frame Relay, or Asynchronous Transfer Mode (ATM).

Optionally, the plurality of records are communicated to the administrator module by the database arrangement, wherein the administrator module extracts the metadata associated with each of the plurality of records. Specifically, the administrator module receives the plurality of records from the database arrangement and isolates metadata associated with each of the plurality of records therefrom. As discussed above, the metadata extracted from each of the plurality of records comprises timestamps detailing times when each of the plurality of records was added in the database arrangement.

The administrator module is operable to determine, from the metadata associated with each of the plurality of records, a time period in which the plurality of records were added to the database arrangement. As mentioned previously, the metadata associated with each of the plurality of records comprises the timestamps detailing times when each of the plurality of records was added in the database arrangement. Subsequently, from the metadata associated with the plurality of records, metadata of a record with an earliest timestamp of addition to the database arrangement (herein denoted using $t_i$) is extracted. Similarly, metadata of a record with a latest timestamp of addition to the database arrangement (herein denoted using $t_f$) is extracted. Consequently, based on the earliest timestamp and the latest timestamp of addition to the database arrangement, the time period in which the plurality of records were added to the database arrangement is determined. In a first example, from the metadata associated with the plurality of records, the metadata of a record with the earliest timestamp of addition to the database arrangement provides a timestamp of Mar. 1, 2018, 08:15:31 AM. Subsequently, the metadata of a record with the latest timestamp of addition to the database arrangement provides a timestamp of Sep. 8, 2018, 10:30:45 PM. Consequently, based on the earliest timestamp and the latest timestamp of addition to the database arrangement, the time period in which the plurality of records were added to the database arrangement is 191 days, 14 hours, 15 minutes and 14 seconds or 16,553,714 seconds.

The administrator module is operable to determine, from the time period and number of processors, the time threshold for a given processor. Specifically, the time period in which the plurality of records were added to the database arrangement is divided by the number of processors in the system to obtain time threshold for a given processor. Notably, the time threshold provides a measure of time intervals that should be allocated to each of the plurality of processors in a instance of uniform time-based distribution of records in the database arrangement. More specifically, the uniform time-based distribution of records in the database arrangement refers to addition of records to the database arrangement in equivalent time intervals. In an example, for a database arrangement with time period in which the plurality of records were added to the database arrangement as 20,000,000 seconds and number of records equal to 10,000,000, the database arrangement has a uniform time-based distribution of records if one record was added every two seconds during the time period in which the plurality of records were added to the database arrangement. It will be appreciated that the non-uniform time-based distribution of records in the database arrangement refers to addition of records to the database arrangement in non-equivalent time intervals. In another example, the time period for in which the plurality of records were added to the database arrangement is 10,000,000 seconds and the number of processors is equal to 50, the time threshold for a given processor is determined as 20,000 seconds. It will be appreciated that the value of time threshold is determined in units of time (such as seconds).

The administrator module is operable to determine, from the number of records and the number of processors, a record threshold for a given processor. Specifically, the number of records is divided by number of processors to determine the record threshold for a given processor. Notably, the record threshold provides a measure of number of records that should be allocated to each of the plurality of processors for processing thereby. Beneficially, a uniform allocation of records to the plurality of processors ensures uniform load distribution among the plurality of processors and timely completion of the task. In an example, the number of records in the database arrangement is 20,000 and number of processors is 5, the determined record threshold for each of the plurality of processors is 4000. It will be appreciated that each of the five processors process 4000 records simultaneously and thus complete the processing in substantially similar time. Consequently, processing of the 20,000 records in the database arrangement by 5 processors working in parallel takes substantially similar time as time taken by a single processor to process 4,000 records. Furthermore, the time interval allocated to each of the plurality of processors is adjusted to ensure that number of records added to the database arrangement in the allocated time interval is substantially similar or identical to the value of record threshold. It will be appreciated that a value of record threshold is in units of number of records.

Optionally, the number of records added to the database arrangement in the allocated time interval to a given processor is within a tolerance range of the record threshold. As mentioned above, the time interval allocated to each of the plurality of processors is adjusted to ensure that number of records added to the database arrangement in the allocated time interval to a given processor is substantially similar or identical to the value of record threshold. Herein, by "substantially", it is meant that a value of records added to the database arrangement in the allocated time interval to a given processor lies within a tolerance range of a value of record threshold.

Optionally, the tolerance range is in a range of 0.1 percent to 10 percent of the record threshold. In an example, the tolerance range may be in a range starting from 0.1, 0.2, 0.3, 0.4, 0.5, 0.6, 0.7, 0.8, 0.9, 1.0, 2.0, 3.0, 4.0, 5.0, 6.0, 7.0, 8.0, 9.0 percent up to 0.5, 0.6, 0.7, 0.8, 0.9, 1.0, 2.0, 3.0, 4.0, 5.0, 6.0, 7.0, 8.0, 9.0, 10.0 percent. In an example, the tolerance range is equal to 10 percent of the record threshold, wherein the value of record threshold is equal to 10,000 records. Therefore, in the example, the time interval allocated to each of the plurality of processors is adjusted to ensure that the number of records in any allocated time interval is in a range of 9,000 to 11,000 records.

More optionally, the tolerance range is equal to 5 percent of the record threshold. Specifically, the number of records added to the database arrangement in the allocated time interval to a given processor is within ±5 percent of the value of record threshold determined for a given processor.

It will be appreciated that with respect to the present disclosure, the computing power of each of the plurality of processors is assumed to of a substantially equivalent value. Specifically, the present disclosure relates to division of a task (specifically, processing operation) in a processing unit amongst the plurality of processors (comprised in the processing unit) with substantially similar computing powers. It is to be understood that adjustments to the allocation of time intervals allocated to each of the plurality of processors are made accordingly if the processing unit comprises plurality of processors with different computing powers. Specifically, if the processing unit comprises the plurality of processors with different computing powers, time interval allocated to a given processor is according to the computing power of the given processor. More specifically, a given processor with higher computing power is allocated a time interval with higher number of records added therein in comparison with the time interval allocated to a processor with lower computing power.

It will be further appreciated that with respect to the present disclosure, the size and/or time required to process each of the plurality of records is assumed to be of substantially equivalent value. Specifically, the present disclosure relates to division of a processing of the plurality of records, with substantially similar sizes and/or times required for processing thereof, amongst the plurality of processors. It is to be understood that adjustments to the allocation of time intervals allocated to each of the plurality of processors is made accordingly if the records in the plurality of records have different sizes and/or times required for processing thereof. Specifically, if the records in the plurality of records have different sizes and/or times required for processing thereof, time interval allocated to a given processor is according to the size and/or time required for processing of the records added to the database arrangement in the allocated time interval. More specifically, time intervals is adjusted to ensure that each of the time intervals comprises records with substantially equivalent overall size and/or processing time.

Furthermore, the time-based distribution of records in the database arrangement refers to a measure of addition of records with respect to time in the database arrangement. Notably, the time-based distribution of records is determined for the time period in which the plurality of records were added to the database arrangement. In other words, time-based distribution of records represents a trend of number of records added to the database arrangement during the time period in which the plurality of records were added to the database arrangement.

The administrator module is operable to adjust the time interval allocated to each of the plurality of processors according to the time threshold and the record threshold based on a time-based distribution of records in the database arrangement. As mentioned previously, the administrator module ensures adjusts the time interval allocate to each of the plurality of processors in a manner that the number of records added to the database arrangement in the allocated time interval (for each processor) is substantially similar or identical to the value of record threshold. Furthermore, for a database comprising uniform time-based distribution of the records, adjusting the time interval allocated to each of the plurality of processors is fairly straightforward. Specifically, a time interval allocated to a given processor having a duration of the time threshold (herein denoted using TT) has number of record equal to the record threshold. In an example of a database arrangement with uniform time-based distribution of records, the database arrangement comprises 10,000,000 records added over a time period of 20,000,000 seconds, wherein one record is added every two seconds in the time period of addition of records to the database arrangement. In such example, the system comprises a plurality of processors with number of processors equal to 100. With respect to the aforementioned values of number of records, time period and number of processors, the time threshold is equal to 20,000 seconds and the record threshold is equal to 10,000 records. Therefore, each processor is allocated a time interval of 20,000 seconds, wherein the first processor processes the records added in the first 20,000 seconds starting from earliest timestamp of addition to the database arrangement ($t_i$). In detail, the first processor is allocated the time interval from ($t_i$ to $t_i$+TT); the second processor is allocated the time interval from ($t_i$+TT to $t_i$+2*TT); and so forth and the hundredth processor is allocated the time interval ($t_i$+99*TT to $t_i$+100*TT). Since one record is added to the database arrangement every two seconds, the number of records added in 20,000 second (duration of time threshold) is equal to 10,000 (value of the record threshold).

However, for the database arrangement with the non-uniform time-based distribution of records, the time interval allocated to each of the plurality of processors, for processing the records added therein, is adjusted using an iterative progression. Herein for the database arrangement with the non-uniform time-based distribution of records, the time interval adjustment to determine time interval for a given processor is described as follows:

$t_i$ represents earliest timestamp of addition to the database arrangement (or timestamp on a first record added to the database arrangement);

$t_f$ represents latest timestamp of addition to the database arrangement (or timestamp on a last record added to the database arrangement)

TT represents the time threshold determined for the database arrangement (determined in units of time such as seconds);

RT represent the record threshold determined for the database arrangement (determined in units of number of records);

$t_{ni}$ represents the beginning time for the time interval allocated to the n-th processor; and $t_{nf}$ represents the end time for the time interval allocated to the n-th processor.

For adjusting the time interval allocated to the first processor, $t_{1i}$ is equal to $t_i$ and $t_{1f}$ is assumed to be equal to ($t_i$+TT) in a first iteration of the iterative progression for the first processor. The number of records added to the database arrangement in the time interval starting from $t_{1i}$ to ($t_i$+TT) Is determined.

Case 1 of Iteration 1 (for first processor): If number of records added to the database arrangement in the time interval starting from $t_{1i}$ to ($t_i$+TT) is equal to RT, the time interval starting from $t_{1i}$ to ($t_i$+TT) is allocated to the first processor.

Case 2 of Iteration 1 (for first processor): If number of records added to the database arrangement in the time interval starting from $t_{1i}$ to ($t_i$+TT) is higher than RT, then $t_{1f}$ is assumed to be equal to ($t_i$+TT/2) in the second iteration of the iterative progression for the first processor.

Case 2.1 of Iteration 2 (for first processor): If number of records added to the database arrangement in the time interval starting from $t_{1i}$ to ($t_i$+TT/2) is equal to record threshold, then the time interval starting from $t_{1i}$ to ($t_i$+TT/2) is allocated to the first processor.

Case 2.2 of Iteration 2 (for first processor): If number of records added to the database arrangement in the time interval starting from $t_{1i}$ to ($t_i$+TT/2) is higher than RT, then $t_{1f}$ is assumed to be equal to ($t_i$+TT/4) in a third iteration of the iterative progression for the first processor.

Case 2.3 of Iteration 2 (for first processor): If number of records added to the database arrangement in the time interval starting from $t_{1i}$ to ($t_i$+TT/2) is lower than RT, then $t_{1f}$ is assumed to be equal to ($t_i$+TT*3/4) in a third iteration of the iterative progression for the first processor.

Case 3 of Iteration 1 (for first processor): If number of records added to the database arrangement in the time interval starting from $t_{1i}$ to ($t_i$+TT) is lower than RT, then $t_{1f}$ is assumed to be equal to ($t_i$+3/2) in the second iteration of the iterative progression for the first processor.

Case 3.1 of Iteration 2 (for first processor): If number of records added to the database arrangement in the time interval starting from $t_{1i}$ to ($t_i$+TT*3/2) is equal to record threshold, then the time interval starting from $t_{1i}$ to ($t_i$+TT*3/2) is allocated to the first processor.

Case 3.2 of Iteration 2 (for first processor): If number of records added to the database arrangement in the time interval starting from $t_{1i}$ to ($t_i$+TT*3/2) is higher than RT, then $t_{1f}$ is assumed to be equal to ($t_i$+TT*5/4) in a third iteration of the iterative progression for the first processor.

Case 3.3 of Iteration 2 (for first processor): If number of records added to the database arrangement in the time interval starting from $t_{1i}$ to ($t_i$+TT*3/2) is lower than RT, then $t_{1f}$ is assumed to be equal to ($t_i$+TT*7/4) in a third iteration of the iterative progression for the first processor.

Similarly, time adjustment allocation for the n-th processor is discussed herein. It is to be understood that $t_{ni}$ (namely, the beginning time for the time interval allocated to the n-th processor) is selected as $t_{(n-1)f}$ (namely, end time for the time interval allocated to the (n−1)-th processor). Therefore, for adjusting the time interval allocated to the n-th processor, $t_{ni}$ is equal to $t_{(n-1)f}$ and $t_{nf}$ is assumed to be equal to ($t_{ni}$+TT) in a first iteration of the iterative progression for the n-th processor. The number of records added to the database arrangement in the time interval starting from $t_{ni}$ to ($t_{ni}$+TT) is determined.

Case 1 of Iteration 1 (for n-th processor): If number of records added to the database arrangement in the time interval starting from $t_{ni}$ to ($t_{ni}$+TT) is equal to RT, the time interval starting from $t_{ni}$ to ($t_{ni}$+TT) is allocated to the n-th processor.

Case 2 of Iteration 1 (for n-th processor): If number of records added to the database arrangement in the time interval starting from $t_{ni}$ to ($t_{ni}$+TT) is higher than RT, then $t_{nf}$ is assumed to be equal to ($t_{ni}$+TT/2) in the second iteration of the iterative progression for the n-th processor.

Case 2.1 of Iteration 2 (for n-th processor): If number of records added to the database arrangement in the time interval starting from $t_{ni}$ to ($t_{ni}$+TT/2) is equal to record threshold, then the time interval starting from $t_{1i}$ to ($t_{ni}$+TT/2) is allocated to the n-th processor.

Case 2.2 of Iteration 2 (for n-th processor): If number of records added to the database arrangement in the time interval starting from $t_{ni}$ to ($t_{ni}$TT/2) is higher than RT, then $t_{nf}$ is assumed to be equal to ($t_{ni}$+TT/4) in a third iteration of the iterative progression for the n-th processor.

Case 2.3 of Iteration 2 (for n-th processor): If number of records added to the database arrangement in the time interval starting from $t_{ni}$ to ($t_{ni}$+TT/2) is lower than RT, then $t_{nf}$ is assumed to be equal to ($t_{ni}$+TT*3/4) in a third iteration of the iterative progression for the n-th processor.

Case 3 of Iteration 1 (for n-th processor): If number of records added to the database arrangement in the time interval starting from $t_{ni}$ to ($t_{ni}$+TT) is lower than RT, then $t_{nf}$ is assumed to be equal to ($t_{ni}$+TT*3/2) in the second iteration of the iterative progression for the n-th processor.

Case 3.1 of Iteration 2 (for n-th processor): If number of records added to the database arrangement in the time interval starting from $t_{ni}$ to ($t_{ni}$+TT*3/2) is equal to record threshold, then the time interval starting from $t_{ni}$ to ($t_{ni}$+TT*3/2) is allocated to the n-th processor.

Case 3.2 of Iteration 2 (for n-th processor): If number of records added to the database arrangement in the time interval starting from $t_{ni}$ to ($t_{ni}$+TT*3/2) is higher than RT, then $t_{nf}$ is assumed to be equal to ($t_{ni}$+TT*5/4) in a third iteration of the iterative progression for the n-th processor.

Case 3.3 of Iteration 2 (for n-th processor): If number of records added to the database arrangement in the time interval starting from $t_{ni}$ to ($t_{ni}$+TT*3/2) is lower than RT, then $t_{nf}$ is assumed to be equal to ($t_{ni}$+TT*7/4) in a third iteration of the iterative progression for the n-th processor.

It will be appreciated that the third iteration has not been discussed in detail here and third and any subsequent iteration is performed in a manner discussed above.

Furthermore, for the last processor amongst the plurality of processors, the time interval allocated starting from $t_{li}$, representing the beginning time for the time interval allocated to the last processor, till $t_{lf}$ representing the end time for the time interval allocated to the last processor is determined. As discussed above for the n-th processor, $t_{li}$ is selected as $t_{(l-1)f}$ (namely, end time for the time interval allocated to the penultimate processor) and $t_{lf}$ is determined as $t_f$ (namely, timestamp on a last record added to the database arrangement).

It will be appreciated that the iterative progression for adjusting time interval allocated to a given processor is continued till the number of records added in a time interval for a given iteration is substantially equal to the record threshold.

Furthermore, each of the processor in the plurality of processors perform processing of the records added in the allocated time interval simultaneously and completes the processing in substantially similar duration of time.

Moreover, the present description also relates to the method as described above. The various embodiments and variants disclosed above apply mutatis mutandis to the method.

Optionally, the plurality of records are communicated to the administrator module by the database arrangement, wherein the method comprises using the administrator module to extract the metadata associated with each of the plurality of records.

Optionally, the number of records added to the database arrangement in the allocated time interval to a given processor is within a tolerance range of the record threshold.

Optionally, the tolerance range is in a range of 0.1 percent to 10 percent of the record threshold.

Optionally, the tolerance range is equal to 5 percent.

DETAILED DESCRIPTION OF THE DRAWINGS

Referring to FIG. 1, there is shown a block diagram of a system 100 for management of a task across a plurality of processors (depicted as processors 102, 104 and 106), in accordance with an embodiment of the present disclosure. The task comprises processing of a plurality of records stored in a database arrangement 108. As shown, the system 100 comprises the processors 102, 104 and 106 and an administrator module 110, and wherein each of the processors 102, 104 and 106 processes a set of records added in a given time interval and the administrator module 110 determines the time interval for a given processor.

FIG. 1 is merely an example, which should not unduly limit the scope of the claims herein. It is to be understood that the simplified illustration of the system 100 for management of a task across a plurality of processors is provided as an example and is not to be construed as limiting the system 100 to specific numbers, types, or arrangements of the processing arrangement. A person skilled in the art will recognize many variations, alternatives, and modifications of embodiments of the present disclosure.

Figure 2:
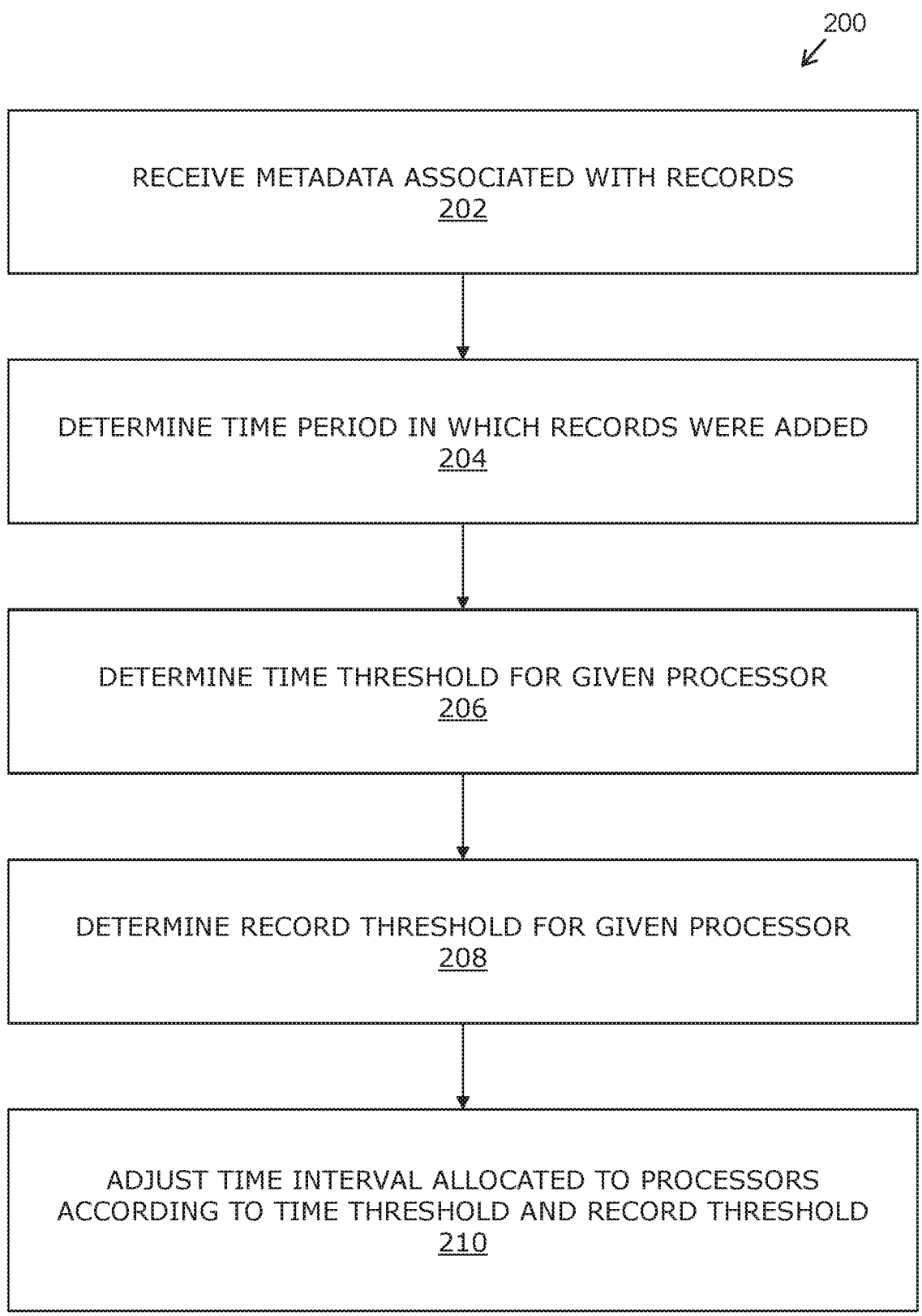
FIG. 2 is an illustration of steps of a method for management of a task across a plurality of processors, in accordance with an embodiment of the present disclosure.

Referring to FIG. 2, there is shown an illustration of steps of a method 200 for management of a task across a plurality of processors, in accordance with an embodiment of the present disclosure. The task comprises processing of a plurality of records stored in a database arrangement. The method 200 is implemented using a system comprising a plurality of processors and an administrator module, and wherein each of the plurality of processors processes a set of records added in a given time interval and the administrator module determines the time interval for a given processor. At a step 202, metadata associated with each of the plurality of records is received from the database arrangement, wherein metadata associated with a given record comprises a timestamp detailing a time when the given record was added to the database arrangement. At a step 204, a time period in which the plurality of records were added to the database arrangement is determined from the metadata associated with each of the plurality of records. At a step 206, the time threshold for a given processor is determined from the time period and number of processors. At a step 208, a record threshold for a given processor is determined from the number of records and the number of processors. At a step 210, the time interval allocated to each of the plurality of processors is adjusted according to the time threshold and the record threshold, based on a time-based distribution of records in the database arrangement.

The steps 202, 204, 206, 208, and 210 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
a plurality of processors;
a database arrangement comprising a plurality of records; and
an administrator module configured to:
receive metadata associated with the plurality of records from the database arrangement, wherein corresponding metadata associated with each record comprises a timestamp detailing a time when each record was added to the database arrangement;
determine, from the corresponding metadata associated with each record of the plurality of records, a time period in which the plurality of records was added to the database arrangement;
determine, from the time period and a number of processors in the plurality of processors, a time threshold for each processor;
determine, from a number of records in the plurality of records and the number of processors in the plurality of processors, a record threshold for each processor;
divide the plurality of records into groups of records corresponding to each processor according to the record threshold for each processor; and
allocate the corresponding groups of records to each processor during the corresponding time threshold for each processor according to a time-based distribution of the plurality of records in the database arrangement, wherein the plurality of processors simultaneously modify the corresponding groups of records.

2. The system of claim 1, wherein the administrator module extracts the corresponding metadata associated with each record of the plurality of records from each record.

3. The system of claim 1, wherein the time period is within a tolerance range of the record threshold.

4. The system of claim 3, wherein the tolerance range is in a range of 0.1 percent to 10 percent of the record threshold.

5. The system of claim 4, wherein the tolerance range is equal to 5 percent.

6. The system of claim 1, wherein the database arrangement and the administrator module are communicably coupled using a data communication network.

7. A method comprising:
using a database arrangement to communicate metadata associated with a plurality of records of the database arrangement to an administrator module; and
using the administrator module to:
receive the metadata associated with the plurality of records from the database arrangement, wherein corresponding metadata associated with a each record comprises a timestamp detailing a time when each record was added to the database arrangement;
determine, from the corresponding metadata associated with each record of the plurality of records, a time period in which the plurality of records was added to the database arrangement;
determine, from the time period and a number of processors in a plurality of processors, a time threshold for each processor;
determine, from the number of records in the plurality of records and the number of processors in the plurality of processors, a record threshold for each processor;

divide the plurality of records into groups of records corresponding to each processor according to the record threshold for each processor; and allocate the corresponding groups of records to each processor during the corresponding time threshold for each processor according to a time-based distribution of the plurality of records in the database arrangement, wherein the plurality of processors simultaneously modify the corresponding groups of records.

8. The method of claim 7, wherein the method comprises using the administrator module to extract the corresponding metadata associated with each record of the plurality of records from each record.

9. The method of claim 7, wherein the time period is within a tolerance range of the record threshold.

10. The method of claim 9, wherein the tolerance range is in a range of 0.1 percent to 10 percent of the record threshold.

11. The method of claim 10, wherein the tolerance range is equal to 5 percent.

\* \* \* \* \*